(No Model.)
M. W. HOLLINGSWORTH.
DENTAL CATAPHORIC APPARATUS.
No. 569,380. Patented Oct. 13, 1896.
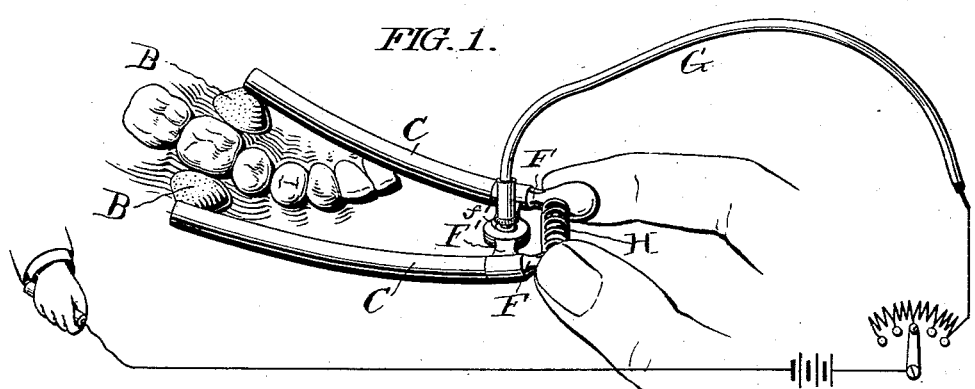
FIG. 1.
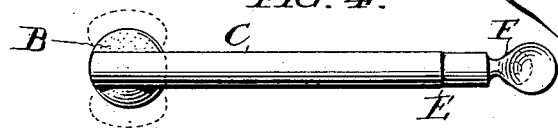
FIG. 4.
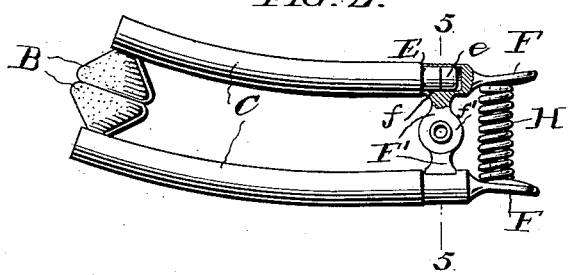
FIG. 2.
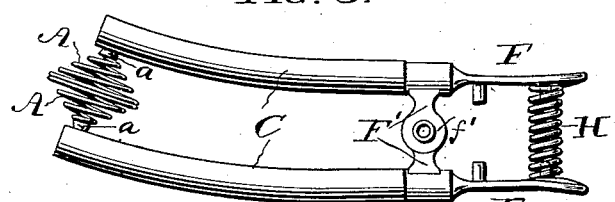
FIG. 3.
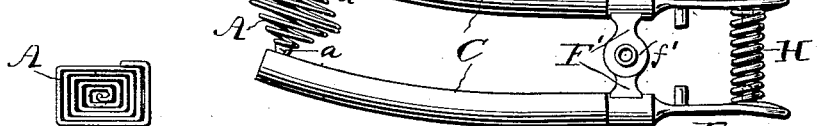
FIG. 10.     FIG. 8.
FIG. 9.    FIG. 5.    FIG. 7.
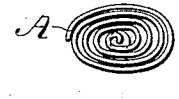
FIG. 6.
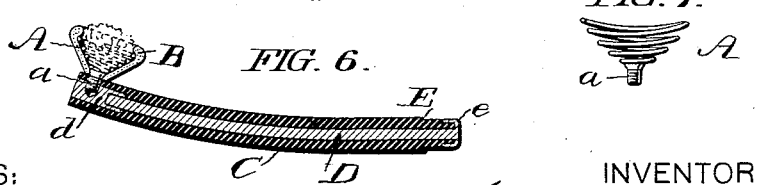
WITNESSES:                 INVENTOR:

United States Patent Office.

MERRILL WEIR HOLLINGSWORTH, OF PHILADELPHIA, PENNSYLVANIA, ASSIGNOR TO THE S. S. WHITE DENTAL MANUFACTURING COMPANY, OF SAME PLACE.

DENTAL CATAPHORIC APPARATUS.

SPECIFICATION forming part of Letters Patent No. 569,380, dated October 13, 1896.

Application filed June 29, 1896. Serial No. 597,284. (No model.)

*To all whom it may concern:*

Be it known that I, MERRILL WEIR HOLLINGSWORTH, a citizen of the United States, residing at Philadelphia, in the county of Philadelphia and State of Pennsylvania, have invented certain new and useful Improvements in Dental Cataphoric Apparatus; and I do hereby declare the following to be a full, clear, and exact description of the invention, such as will enable others skilled in the art to which it appertains to make and use the same.

It is well known that liquids can be introduced by electricity into the body through or beyond the skin or mucous membranes thereof, such treatment being technically termed "cataphoresis."

My invention relates to certain improvements, as hereinafter claimed, by which obtundents or local anesthetics can be readily applied electrically to prevent infliction of pain during dental operations.

In the accompanying drawings, which show so much of apparatus as is required for illustrating a suitable way of embodying my improvements, Figure 1 is a view in perspective, partly diagrammatic, showing the apparatus as applied to the gums adjacent to the root or base of a tooth. Fig. 2 is a plan view with a portion in section, showing the apparatus when not in use, with the conducting-wire omitted. Fig. 3 is a view generally similar to Fig. 2, showing slight modification. Fig. 4 is a view at a right angle with Figs. 2 and 3. Fig. 5 is a section on the line 5 of Fig. 2, with the conducting-wire coupled in place. Fig. 6 is a longitudinal central section of one of the obtundent-carriers and its arm or support. Figs. 7 and 8 show a side view and an end view of a slightly-modified form of obtundent-carrier, and Figs 9 and 10 are similar views of another modification of the carrier.

Two similar carriers for a suitable obtundent are shown as formed of wire spirally coiled into conical cup form and covered by rubber.

A indicates the spirally-coiled wire, and B the rubber cover of the carriers tightly fitting around the wire. Each yielding or self-adjusting carrier is adapted to be detachably connected with the outer end of its respective arm or support C C at the apex or smaller end of the wire coil A, which is provided with an attaching-screw $a$. Each carrier-arm C is formed of suitable non-conducting material, preferably hard rubber, lengthwise through which passes a conductor consisting of a suitable wire D, having at its outer end an enlarged piece $d$, into a threaded socket in which the attaching-screw $a$ of a carrier is screwed, the screw passing through an opening in the carrier-arm. Fig. 6 shows the manner of connecting one of the carriers with its arm and the conductor therein, and the connection between the other carrier and its arm and conductor is similarly made. The carriers project toward each other from the inner or opposite sides of the carrier-arms at the outer ends thereof, so that the enlarged opposite surfaces of the carriers may be moved toward or from each other by movements of the arms C C, which are suitably adjustably connected with each other at or near their inner ends to permit of the desired adjustments of the carriers.

Each carrier-arm C is embraced at its inner end, where it is reduced in diameter, by a metallic ferrule $e$, attached to the conductor-wire D. The reduced inner end portion of each carrier-arm constitutes a pivot or bearing journal extending to the shoulder E and surrounded or bushed by the ferrule $e$, shown as extending for a portion only of the length of the journal. The carrier-arms are adjustably connected together by means of two handle arms or pieces F F, having bearing-sockets $f\,f$ and jointed to each other by way of their coupling-lugs F' F' and a connecting-pivot $f'$. This pivot is made tubular to adapt it to serve as a receptacle or holder for the coupling end $g$ of a conducting-wire G. A coiled spring H, embracing pins on the handle-arms, acts, as will be seen, with a tendency to hold the obtundent-carriers in contact or exerts pressure in a direction tending to force them together or clamp them upon any intervening surfaces. The two carrier-arms have their journal-like inner ends fitted in their bearing-sockets of the finger-pieces with sufficient tightness to be frictionally held against accidental turning, while admitting of their being independently turned in their sockets as desired.

The carrier-arms are longitudinally curved to correspond, approximately, with the curvature of the human jaw.

In operation pledgets of cotton placed in the carriers are thoroughly saturated with a suitable obtundent, such, say, as guaiacocain, the carriers adjusted to bear upon or adjacent to the part to be obtunded, (see Fig. 1,) and the operator having removed his hand from the finger-pieces and placed the negative electrode of any suitable construction in the hand of or otherwise in proper contact with the person upon whom the operation is to be performed the current is turned on and the obtunding operation conducted in well-known way preparatory to the dental operation to be performed. By properly turning one or both of the carrier-arms in their sockets in the handle-pieces the carriers may readily be adjusted to cause the saturated pledgets to be yieldingly clamped in contact with the surfaces at or adjacent to the parts to be obtunded, the spring between the handle-pieces acting to clamp the apparatus in place, as will readily be understood.

Fig. 3 shows the handle-pieces as of increased length and with two sets of spring-engaging pins to adapt the spring to be adjusted to vary its clamping force.

Figs. 7 and 8 show a carrier of substantially elliptical form in cross-section with its outer or terminal surface concaved or dished, and Figs. 9 and 10 show a carrier of substantially rectangular form in cross-section with its outer or terminal surface concaved or dished. Rubber covers for these modified forms of carriers are preferably employed, as with the before-described carriers, to confine the obtundent liquid as well as prevent metallic contact with the person. Such covers are not, however, absolutely essential, as the coiled-wire carriers may otherwise be suitably insulated.

The apparatus may be turned over for application to the side of the jaw opposite that to which it is shown as adjusted and is applicable equally well to the upper and lower jaws and to surfaces forward or back of the point of application shown.

While the duplex or two-arm apparatus described is decidedly preferable to a one-armed apparatus because of its self-sustaining action and the more rapid and thorough introduction of the obtundent to the desired point, I do not wish to be understood as confining my invention to the duplex construction, as a single arm with my improved yielding or self-adjusting carrier may advantageously be employed in some cases. The carriers might also consist solely of the rubber cups, (before described as covers,) dispensing with the coiled wire, and they would constitute yielding obtundent-carriers, self-conforming to the surfaces with which contact is to be made by the saturated pledgets.

I claim as my invention—

1. In cataphoric apparatus, the yielding carrier adapted to be self-conforming to the surface with which contact is to be made, substantially as set forth.

2. In cataphoric apparatus, the yielding or self-conforming carrier of coiled wire, substantially as set forth.

3. In cataphoric apparatus, the carrier consisting of coiled wire and the rubber cover, substantially as set forth.

4. In cataphoric apparatus, the combination of the carriers, and the adjustably-connected, spring-actuated carrier-arms curved to correspond approximately with the curvature of the human jaw, substantially as set forth.

5. In cataphoric apparatus, the combination of the carriers, the adjustably-connected, spring-actuated carrier-arms, and the handle-pieces with which the respective carrier-arms have turning connection, substantially as set forth.

In testimony whereof I affix my signature in presence of two witnesses.

MERRILL WEIR HOLLINGSWORTH.

Witnesses:
EDW. F. SIMPSON, Jr.,
R. DALE SPARHAWK.